(12) United States Patent
Sprain

(10) Patent No.: US 12,424,887 B2
(45) Date of Patent: Sep. 23, 2025

(54) APPARATUS AND PROCESS FOR CONVERSION OF ENERGY

(71) Applicant: Quantum Dynamics Enterprises, Inc., Key West, FL (US)

(72) Inventor: Harry Paul Sprain, Key West, FL (US)

(73) Assignee: Quantum Dynamics Enterprises, Inc., Key West, FL (US)

( * ) Notice: Subject to any disclaimer, the term of this patent is extended or adjusted under 35 U.S.C. 154(b) by 308 days.

(21) Appl. No.: 18/252,296

(22) PCT Filed: Aug. 8, 2022

(86) PCT No.: PCT/US2022/039726
§ 371 (c)(1),
(2) Date: May 11, 2023

(87) PCT Pub. No.: WO2023/018664
PCT Pub. Date: Feb. 16, 2023

(65) Prior Publication Data
US 2023/0275477 A1 Aug. 31, 2023

Related U.S. Application Data

(60) Provisional application No. 63/230,892, filed on Aug. 9, 2021.

(51) Int. Cl.
*H02K 1/2746* (2022.01)
*H02K 1/17* (2006.01)
*H02K 7/06* (2006.01)

(52) U.S. Cl.
CPC .............. *H02K 1/2746* (2013.01); *H02K 1/17* (2013.01); *H02K 7/06* (2013.01)

(58) Field of Classification Search
CPC ........ H02K 1/17; H02K 1/274; H02K 1/2746; H02K 7/06; H02K 7/061
See application file for complete search history.

(56) References Cited

U.S. PATENT DOCUMENTS

| | | | |
|---|---|---|---|
| 2,553,298 A | 5/1951 | Brunelle et al. | |
| 2,669,670 A | 2/1954 | Eggers | |

(Continued)

FOREIGN PATENT DOCUMENTS

| | | |
|---|---|---|
| CN | 104279133 A | 1/2015 |
| DE | 2706691 A1 | 8/1978 |

(Continued)

OTHER PUBLICATIONS

DE4424525A1 _-_ Translation.pdf (Year: 2025).*

(Continued)

*Primary Examiner* — Christopher M Koehler
*Assistant Examiner* — Ahmed F Seck
(74) *Attorney, Agent, or Firm* — Baker Donelson; Dorian B. Kennedy; Carl M. Davis, II

(57) ABSTRACT

An apparatus for the conversion of energy has a rotatable rotor mounted within a stationary stator. The rotor has a main rotor portion and several rotor magnet assemblies mounted for radial, reciprocating lateral movement relative to the main rotor portion. Each rotor magnet assembly includes a movable arm and a rotor magnet mounted to the outermost end or outboard end of the arm. The stator includes a peripheral mount or housing and a series of stator magnets coupled to the peripheral housing. The stator magnets has the same polarity as the adjacent rotor magnet. The stator magnets and peripheral housing are arranged in a. somewhat spiral configuration between a first or starting end and a second or finishing end and has a space therebetween. The starting end is positioned distally from the rotor while (Continued)

the finishing end is positioned proximate the rotor. A method for conversion of energy is disclosed.

12 Claims, 6 Drawing Sheets

(56) References Cited

U.S. PATENT DOCUMENTS

| | | | |
|---|---|---|---|
| 2,864,018 | A | 12/1958 | Aeschmann |
| 3,263,796 | A | 8/1966 | Parke |
| 4,074,153 | A | 2/1978 | Baker et al. |
| 4,215,330 | A | 7/1980 | Hartman |
| 4,562,399 | A | 12/1985 | Fisher |
| 4,571,528 | A | 2/1986 | McGee |
| 4,728,833 | A | 3/1988 | Shiraki |
| 4,758,756 | A | 7/1988 | Pouillange |
| 4,843,268 | A | 6/1989 | Hovorka |
| 4,972,112 | A | 11/1990 | Kim |
| 5,105,139 | A | 4/1992 | Lissack |
| 5,219,034 | A | 6/1993 | Wortham |
| 5,444,369 | A | 8/1995 | Luetzow |
| 5,585,680 | A | 12/1996 | Tsoffka |
| 5,677,583 | A * | 10/1997 | Kawai ............... H02K 41/06 310/82 |
| 6,031,651 | A | 2/2000 | Nakasugi |
| 6,049,146 | A | 4/2000 | Takara |
| 6,262,508 | B1 | 7/2001 | Shibayama |
| 6,271,614 | B1 | 8/2001 | Arnold |
| 6,954,019 | B2 * | 10/2005 | Sprain ............... H02K 21/14 310/152 |
| 7,265,471 | B2 | 9/2007 | Sprain |
| 2005/0039556 | A1 | 2/2005 | Nowlan |
| 2008/0238238 | A1 | 10/2008 | Sprain |
| 2012/0280588 | A1 | 11/2012 | Bryson |
| 2019/0273417 | A1 | 9/2019 | Senik |
| 2021/0299096 | A1 | 9/2021 | Jenlinek et al. |

FOREIGN PATENT DOCUMENTS

| | | | |
|---|---|---|---|
| DE | 4424525 A1 * | 1/1995 | ............ H02K 53/00 |
| DE | 102009037657 A1 | 2/2011 | |
| GB | 2481604 A * | 1/2012 | ............ H02K 49/10 |
| JP | 60167675 | 8/1985 | |
| JP | 60167676 A | 8/1995 | |

OTHER PUBLICATIONS

David Scott, "Magnetic 'Wankel' for Electric Cars", Popular Science, Jun. 1979, pp. 80-81.
PCT International Search Report, PCT/US22/39726 (Jan. 10, 2023).
PCT Written Opinion, PCT/US22/39726 (Jan. 10, 2023).

* cited by examiner

APPARATUS AND PROCESS FOR CONVERSION OF ENERGY

CROSS REFERENCE TO RELATED APPLICATION

This application claims the benefit of U.S. Provisional Patent Application No. 63/230,892 filed Aug. 9, 2021 and entitled "Apparatus And Process for Conversion of Energy", and is incorporated herein by reference.

TECHNICAL FIELD

This invention relates generally to an apparatus and process for converting energy and more specifically to an apparatus and process for converting centrifugal energy into lateral directional energy.

BACKGROUND OF THE INVENTION

There are numerous disclosures in the prior art of various apparatus and processes to generate energy. Examples of sources of energy include nuclear, petroleum, air, heat, water, etc.

Energy can be used in a multitude of ways, such as automotive and other engines, mechanisms for opening and closing, systems for moving objects from one place or position to another, etc. As energy is a valuable and required commodity for today's world, many attempts have been made to generate energy in an efficient and cost effective process.

With specific regard to engines, U.S. Pat. No. 5,219,034 discloses a vehicle powered by a magnetic engine which includes a block fitted with multiple cylinders for receiving magnetic pistons attached to a crankshaft and electromagnets mounted in the engine head for magnetically operating the magnetic pistons by electric current reversal. U.S. Pat. No. 5,444,369 discloses a sensor that produces a linear output signal in detecting the rotational positions of a throttle valve in an internal combustion engine. U.S. Pat. No. 6,049,146 discloses an electromagnetic piston engine capable of producing driving power by a reciprocal movement of a piston in a cylinder by electromagnetic force. These examples of engines provide energy; however, these devices are inefficient as they typically require reciprocating motion that wastes energy.

Although many apparatus and processes have been developed to generate energy for specific applications, there continues to be a need in this industry for an effective, inexpensive and reliable apparatus and process for generating energy. It is to the provision of such therefore that the present invention is primarily directed.

SUMMARY OF THE INVENTION

The present invention meets the need in the industry by providing an apparatus for conversion of energy comprises a rotor leaving a main portion, a central rotor shaft coupled to the main portion, and at least one radially moving rotor magnet assembly coupled to the main portion for reciprocal movement between an extended position and a retracted position. The rotor is rotatable in a direction of rotor rotation. The rotor magnet assembly includes a rotor magnet and a reciprocating arm coupled to the rotor magnet and to the main portion. The apparatus for conversion of energy also has a stator positioned about the rotor. The stator has a series of stator magnets extending from a starting end to a finishing end in the direction of rotor rotation. Each stator magnet of the series of stator magnets is positioned more proximal to the rotor than the preceding stator magnet of the series of stator magnets in a direction extending from the starting end to the finishing end. The stator magnets are of the same polarity as the rotor magnet. With this construction, the rotation of the rotor shaft causes rotation of the rotor in the direction of rotor rotation, and the rotation of the rotor causes the rotor magnet assembly to move from the extended position to the retracted position due to the increasing repulsive magnetic field between the rotor magnet and the stator magnets as the rotor magnet moves in the direction of rotor rotation from a position adjacent the stator magnet of the starting end to a position adjacent the stator magnet of the finishing end.

Further, the apparatus for conversion of energy recited above, wherein a space is positioned between said starting end and said finishing end of said series of stator magnets, wherein said space does not include any stator magnets.

Further, the apparatus for conversion of energy recited above, wherein said rotor has a plurality of rotor magnet assemblies.

The apparatus for conversion of energy recited above and further comprising a second rotor having a second main portion, a second central rotor shaft coupled to said second main portion, and at least one radially moving second rotor magnet assembly coupled to said second main portion for reciprocal movement between an extended position and a retracted position, said second rotor being rotatable in a second direction of rotor rotation, said second rotor magnet assembly including a second rotor magnet and a second reciprocating arm coupled to said second rotor magnet and to said second main portion, and a second stator positioned about said second rotor, said second stator having a second series of second stator magnets extending from a second starting end to a second finishing end in the second direction of rotor rotation, each said second stator magnet of said second series of second stator magnets being positioned more proximal to said second rotor than the preceding second stator magnet of said second series of second stator magnets in a direction extending from said second starting end to said second finishing end, said second stator magnets being the same polarity as said second rotor magnet.

Further, the apparatus for conversion of energy recited above, wherein said second direction of rotor rotation is in an opposite rotational direction than said direction of rotor rotation.

In another aspect, the present invention provides an apparatus for conversion of energy, comprising a rotor and a stator positioned about the rotor. The rotor having a main portion and a plurality of rotor magnet assemblies coupled to said main portion for reciprocal movement between an extended position and a retracted position, said rotor being rotatable in a direction of rotor rotation, each said rotor magnet assembly of said plurality of rotor magnet assemblies including a rotor magnet and a mounting arm coupled to said rotor magnet. The stator positioned about said rotor, having a plurality of stator magnets extending from a starting end to a finishing end in the direction of rotor rotation, each said stator magnet of said plurality of stator magnets being positioned closer to said rotor than the preceding stator magnet of said plurality of stator magnets in a direction from said starting end to said finishing end. The rotation of the rotor in the direction of rotor rotation causes the rotor magnet assemblies to move from their extended position to their retracted position due to the increasing repulsive magnetic field between the rotor magnet and the stator magnets as the rotor magnet moves in the direction of rotor rotation from a position adjacent the stator magnet of the starting end to a position adjacent the stator magnet of the finishing end.

Further, the apparatus for conversion of energy recited above, wherein a space is positioned between said starting end and said finishing end of said series of stator magnets, wherein said space does not include any stator magnets.

Further, the apparatus for conversion of energy recited above, wherein said stator magnets are the same polarity as said rotor magnets.

The apparatus for conversion of energy recited above and further comprising a second rotor and a second stator positioned about the second rotor. The second rotor having a second main portion and a second plurality of second rotor magnet assemblies coupled to said second main portion for reciprocal movement between an extended position and a retracted position, said second rotor being rotatable in a second direction of rotor rotation, each said second rotor magnet assembly including a second rotor magnet and a second mounting arm coupled to said second rotor magnet. The second stator positioned about said second rotor, and having a second plurality of second stator magnets extending from a second starting end to a second finishing end in the second direction of rotor rotation, each said second stator magnet of said second plurality of second stator magnets being positioned more proximal to said second rotor than the preceding second stator magnet of said second plurality of second stator magnets in a direction extending from said second starting end to said second finishing end, said second stator magnets being the same polarity as said second rotor magnet.

Further, the apparatus for conversion of energy recited above, wherein said second direction of rotor rotation is in an opposite rotational direction than said direction of rotor rotation.

In yet another aspect, the present invention provides an apparatus for conversion of energy, comprising a rotor and a stator positioned about the rotor. The rotor having a plurality of rotor magnet assemblies movable between an extended position and a retracted position, said rotor being rotatable in a direction of rotor rotation, each said rotor magnet assembly including a rotor magnet and a movable arm coupled to said rotor magnet. The stator positioned about said rotor, and having a series of stator magnets extending from a starting end to a finishing end in the direction of rotor rotation, each said stator magnet of said series of stator magnets being positioned more proximal to said rotor than the preceding stator magnet of said series of stator magnets in a direction extending from said starting end to said finishing end, said stator magnets being the same polarity as said rotor magnet. Rotation of the rotor in the direction of rotor rotation causes each rotor magnet assembly to move from the extended position to the retracted position due to the increasing repulsive magnetic field between the rotor magnet and the stator magnets as the rotor magnet moves in the direction of rotor rotation from a position adjacent the stator magnet located at the starting end to a position adjacent the stator magnet located at the finishing end.

Further, the apparatus for conversion of energy recited above, wherein a space is positioned between said starting end and said finishing end of said series of stator magnets, wherein said space does not include any stator magnets.

Further, the apparatus for conversion of energy recited above, wherein said rotor has a housing and said plurality of rotor magnet assemblies are coupled to said housing.

The apparatus for conversion of energy recited above, and further comprising a second rotor and a second stator positioned about the second rotor. The second rotor having a second plurality of moving second rotor magnet assemblies movable between an extended position and a retracted position, said second rotor being rotatable in a second direction of rotor rotation, each said second rotor magnet assembly including a second rotor magnet and a second reciprocating arm coupled to said second rotor magnet. The second stator positioned about said second rotor, said second stator having a second series of second stator magnets extending from a second starting end to a second finishing end in the second direction of rotor rotation, each said second stator magnet of said second series of second stator magnets being positioned more proximal to said second rotor than the preceding second stator magnet of said second series of second stator magnets in a direction from said second starting end to said second finishing end, said second stator magnets being the same polarity as said second rotor magnet.

Further, the apparatus for conversion of energy recited above, wherein said second direction of rotor rotation is in an opposite rotational direction than said direction of rotor rotation.

In yet another aspect, the present invention meets the need in the industry by providing a method for conversion of energy, comprising the steps of (a) providing a rotor relative to a stator positioned about the rotor, the rotor for rotating in a direction of rotor rotation, said rotor having a main portion, a central rotor shaft coupled to said main portion, and at least one radially moving rotor magnet assembly coupled to said main portion for reciprocal movement between an extended position and a retracted position, said rotor magnet assembly including a rotor magnet and a reciprocating arm coupled to said rotor magnet and to said main portion, and the stator having a series of stator magnets extending from a starting end to a finishing end in the direction of rotor rotation, each said stator magnet of said series of stator magnets being positioned more proximal to said rotor than the preceding stator magnet of said series of stator magnets in a direction extending from said starting end to said finishing end, said stator magnets being the same polarity as said rotor magnet; and (b) rotating the rotor in the direction of rotor rotation to move the rotor magnet assembly from the extended position to the retracted position due to the increasing repulsive magnetic field between the rotor magnet and the stator magnets as the rotor magnet moves in the direction of rotor rotation from a position adjacent the stator magnet of the starting end to a position adjacent the stator magnet of the finishing end.

Further, the method as recited above, further comprising the step of coupling a mechanical device to the reciprocating arm, whereby a lateral outward thrust of the rotor magnet assembly acts to impart a lateral force upon the mechanical device Objects, advantages and features of the present invention will become apparent upon a reading of the following detailed description in conjunction with the drawings.

DETAILED DESCRIPTION

Figure 1:
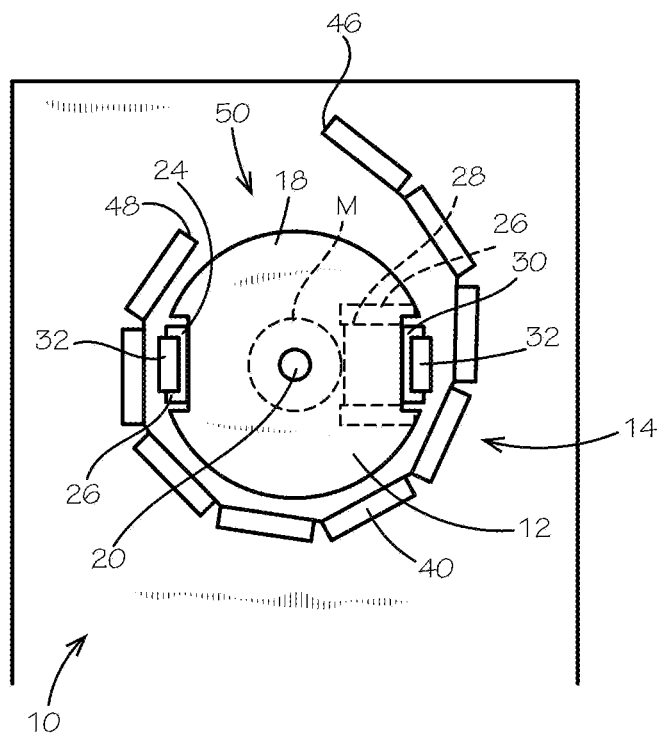
FIG. 1 illustrates a top view of an apparatus for conversion of energy embodying principles of the invention in a preferred form.
Figure 2:
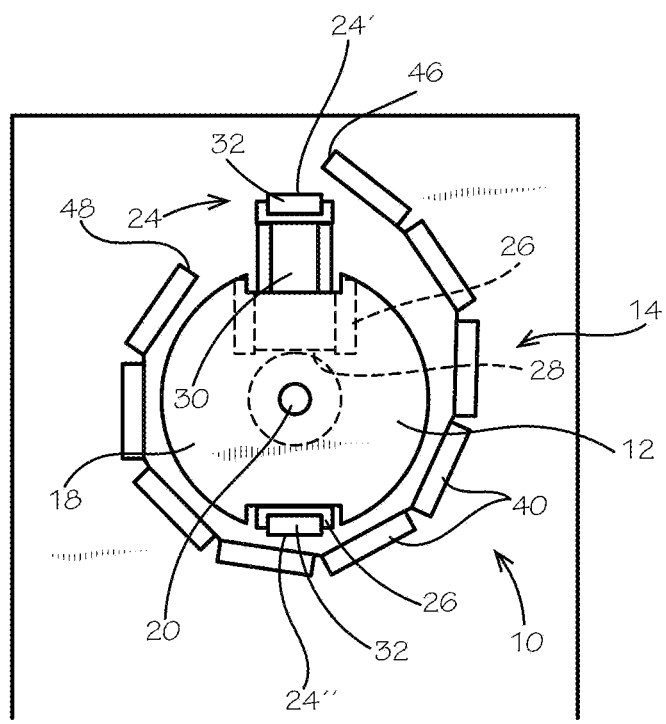
FIG. 2 illustrates a top view of the apparatus for conversion of energy shown in FIG. 1.
Figure 3:
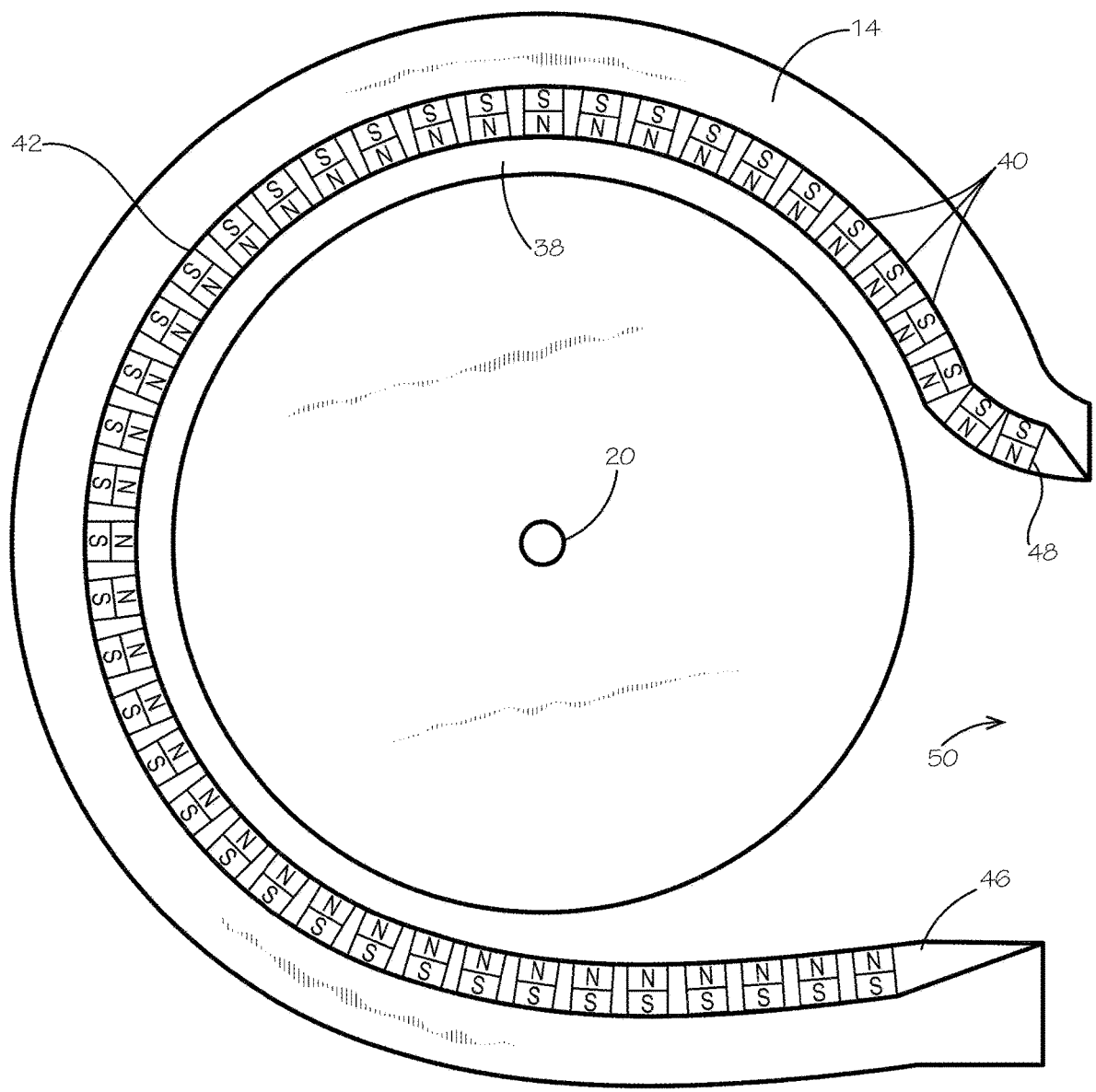
FIG. 3 illustrates a top view of select portions of the apparatus for conversion of energy shown in FIG. 1.
Figure 4:
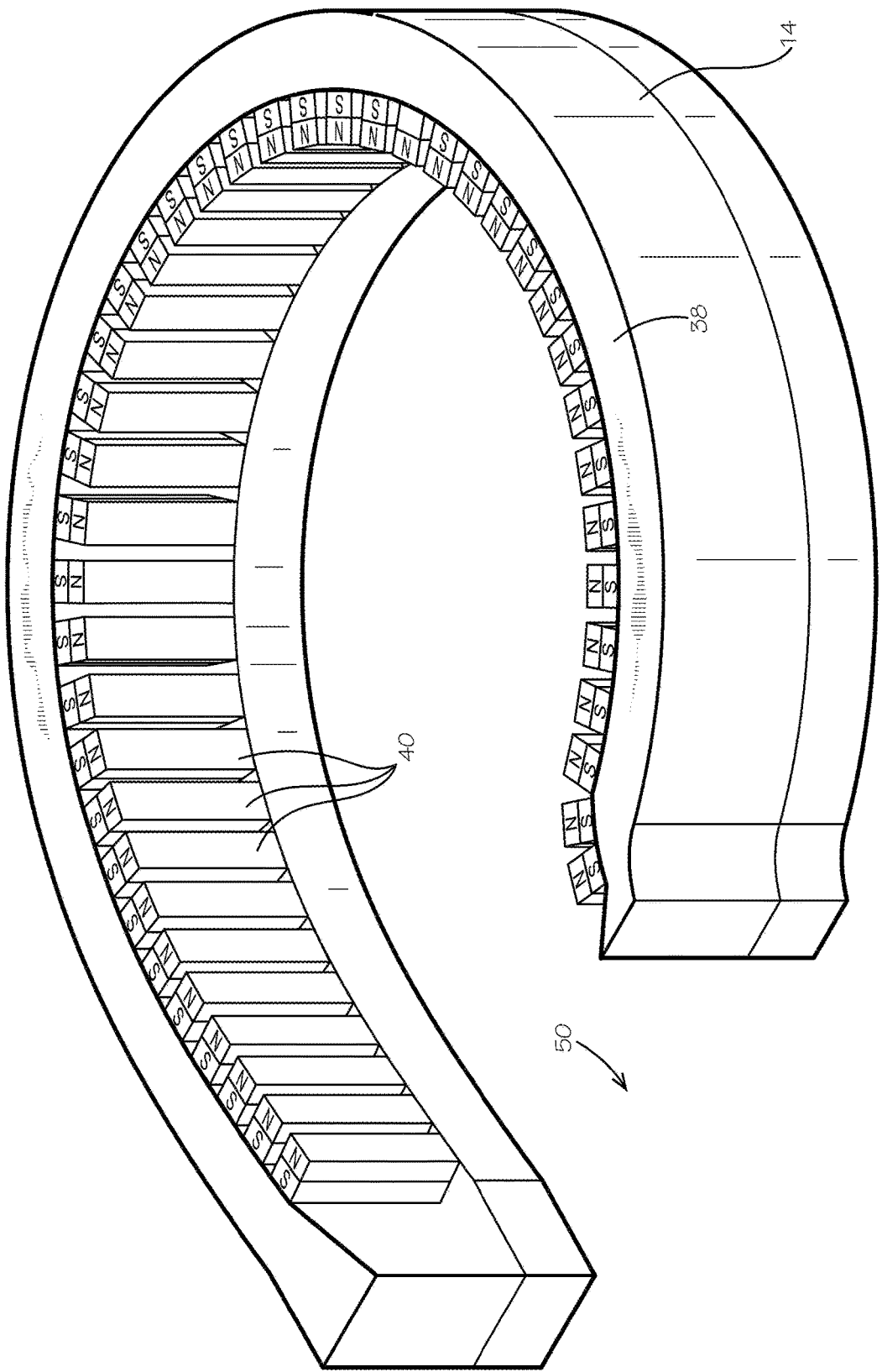
FIG. 4 illustrates a top view of the stator of the apparatus for conversion of energy shown in FIG. 1.

With reference next to the drawings, FIGS. 1-4 illustrate an apparatus for the conversion of energy or an energy converter 10 embodying principles of the invention in a preferred form. The energy converter 10 converts centrifugal energy (or force) into lateral directional energy (or force).

The energy converter 10 includes a rotatable rotor 12 generally mounted concentrically within a stationary stator 14. The rotor 12 is round in shape and includes a main rotor portion 18 mounted to a shaft 20 that is coupled to a rotating source such as an electric motor M. The rotor 12 also has several rotor magnet assemblies 24 mounted for radial, reciprocating lateral movement relative to the main rotor portion 18. The number of rotor magnet assemblies 24 can vary from at least one to any number of rotor magnet assemblies 24 depending on the specific apparatus being used.

Each rotor magnet assembly 24 includes an arm block 26 having an arm passage 28 therethrough and a movable arm 30 journaled within the arm passage 28 for lateral, reciprocating movement relative to the arm block 26 in a radial direction. A rotor magnet 32 is mounted to the outermost end or outboard end of each arm 30. The movable arm 30 is coupled to an unshown mechanical device which utilizes the inward or inbound lateral movement of the movable arm 30 as a lateral driving force for doing work.

The stator 14 includes a peripheral mount or housing 38 and a series of stator magnets 40 coupled to the interior or inner surface 42 of the peripheral housing 38. The number of stator magnets 40 can vary from at least one to any number of magnets depending on the specific apparatus being used. Alternatively, the stator magnets 40 can be arranged in any type of Halbach or other array as long as the array repels the rotor magnets 32 positioned adjacent the stator magnet 40. The stator magnets 40 have the same polarity as the adjacent rotor magnet 32.

The stator magnets 40 are arranged in a somewhat spiral configuration between a first or starting end 46 and a second or finishing end 48. The arrangement of stator magnets 40 also includes a gap or space 50 between the starting end 46 and finishing end 48. The starting end 46 is positioned distally from the rotor 12 while the finishing end 48 is positioned proximate the rotor 12, i.e., the stator magnets 40 of the starting end 46 are set at a distance greater from the rotor 12 than the distance of the stator magnets 40 of the finishing end 48 from the rotor 12. Thus, each stator magnet 40 is located at a generally continually decreasing distance from the outer surface of the main rotor portion 18 with respect to a clockwise direction along the series of stator magnets 40 and the preceding stator magnet in the direction of rotor rotation R shown in FIGS. 1 and 2.

The locations of the stator magnets 40 create a magnetic field of increasing repulsive magnetic strength in the direction of rotor rotation as the stator magnets 40 have the same polarity as the rotor magnets 32. The repulsive magnetic field forces the rotor magnet assemblies 24 inwardly towards or into the main rotor portion 18 of the rotor 12 as the rotor rotates. Thus, the rotor magnet assemblies 24 reciprocally move between an extended position wherein the rotor magnets 32 are distal the main rotor main portion 18, and a retracted position wherein the rotor magnets 32 are closely adjacent the main rotor portion 18. The magnetic field created by the rotor magnets 32 and stator magnets 40 is continuous except for the portion along the stator space 50 where there is an absence of a magnetic force, or at most, a very weak magnetic force, relating to the stator magnets 40.

In use, the activation of the motor M causes the rotation of the rotor shaft 20, thereby causing rotation of the rotor 12 in a direction of rotor rotation R relative to the stator 14. As each rotor magnet 32 positions within space 50, and therefore in an extended position relative to the main rotor portion 18, the respective rotor magnet approaches the starting end 46 of the series of stator magnets 40, and the magnetic field of repulsion causes the rotor magnet 32 to move away from the ever closing stator magnet 40. The rotor magnet assembly 24' is shown in the drawings in an extended or nearly-extended position while rotor magnet assembly 24" is shown in the drawings in a retracted or semi-retracted position. This magnetic repulsion force causes the rotor magnet assembly 24 to move inwardly against the centrifugal force acting upon the rotating rotor magnet assembly 24. As each successive stator magnet 40 is positioned closer to the rotor 12 than the previous stator magnet 40, as the rotor assembly moves in the clockwise direction during each cycle of the rotor, the rotor magnet assembly 24 continuously moves inwardly closer and closer to its fully retracted position until the rotor magnet assembly 24 is aligned closely adjacent the last stator magnet 40 located at the finishing end 48 of the series of stator magnets 40.

As the rotor magnet assembly 24 moves past the last stator magnet 40 and into the stator space 50, the repulsive magnetic force between the rotor magnet 32 and the stator magnet 40 quickly weakens and the centrifugal force acting upon the rotating rotor magnet assembly 24 causes the rotor magnet 32 and movable arm 30 to quickly move or thrust outwardly to the extended position of the rotor magnet assembly 24. This lateral outward thrust or movement of the rotor magnet assembly 24 acts upon or is harnessed by the connected mechanical device so as to impart a lateral force upon the mechanical device that can be utilized to create mechanical work, i.e., the connected mechanical device has work done by the lateral force through by the outwardly movement and mass of the rotor magnet assembly.

As each rotor magnet assembly 24 sequentially moves through the space 50, the rotor magnet assembly 24 once again starts to move inwardly from its extended position to its retracted position due to the approaching stator magnet 40 of the starting end 46, and a new cycle thereby commences with each revolution of the rotor 12.

Figure 5:
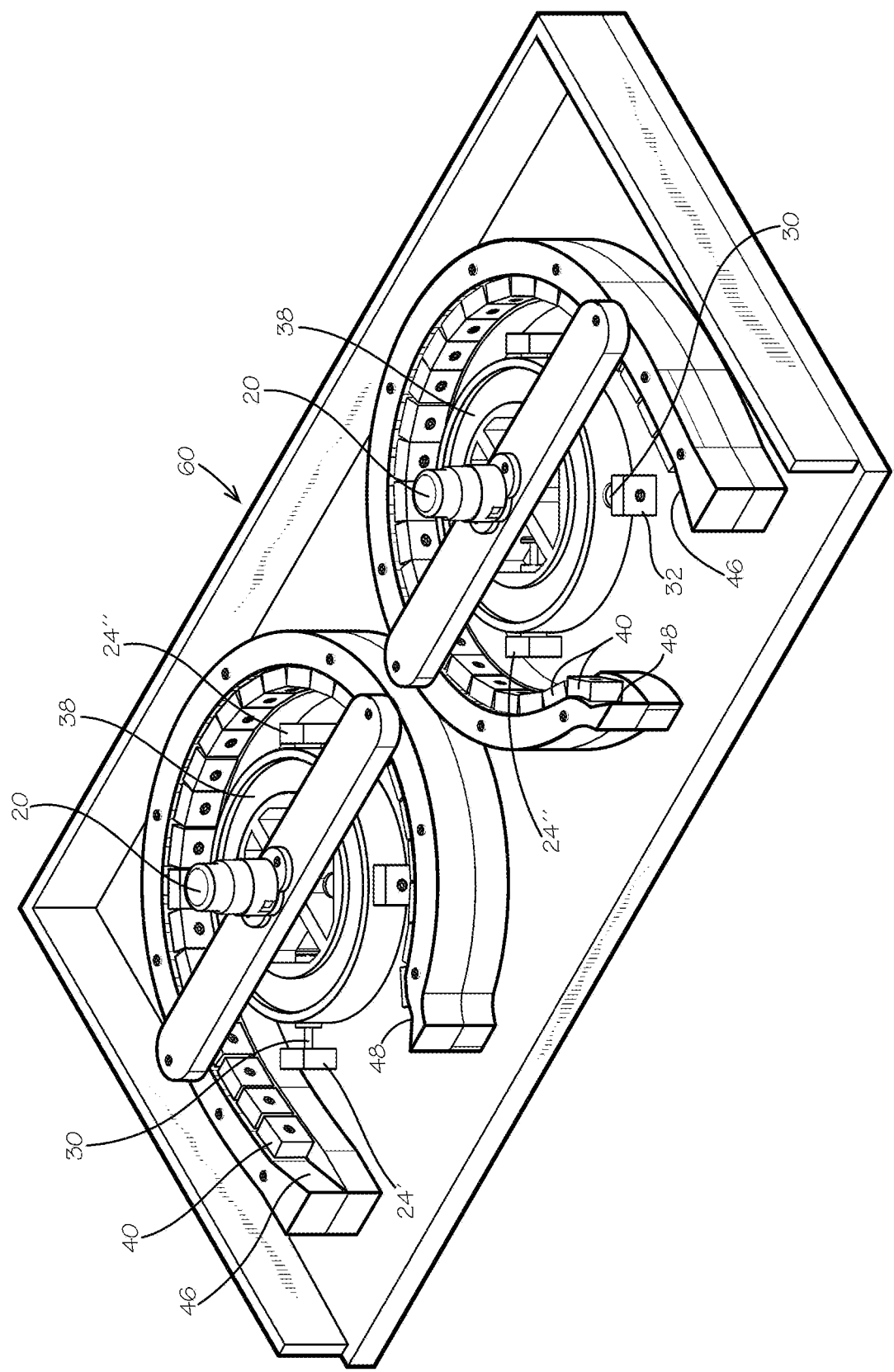
FIG. 5 illustrates a perspective view of an apparatus for conversion of energy embodying principles of the invention in another preferred form.
Figure 6:
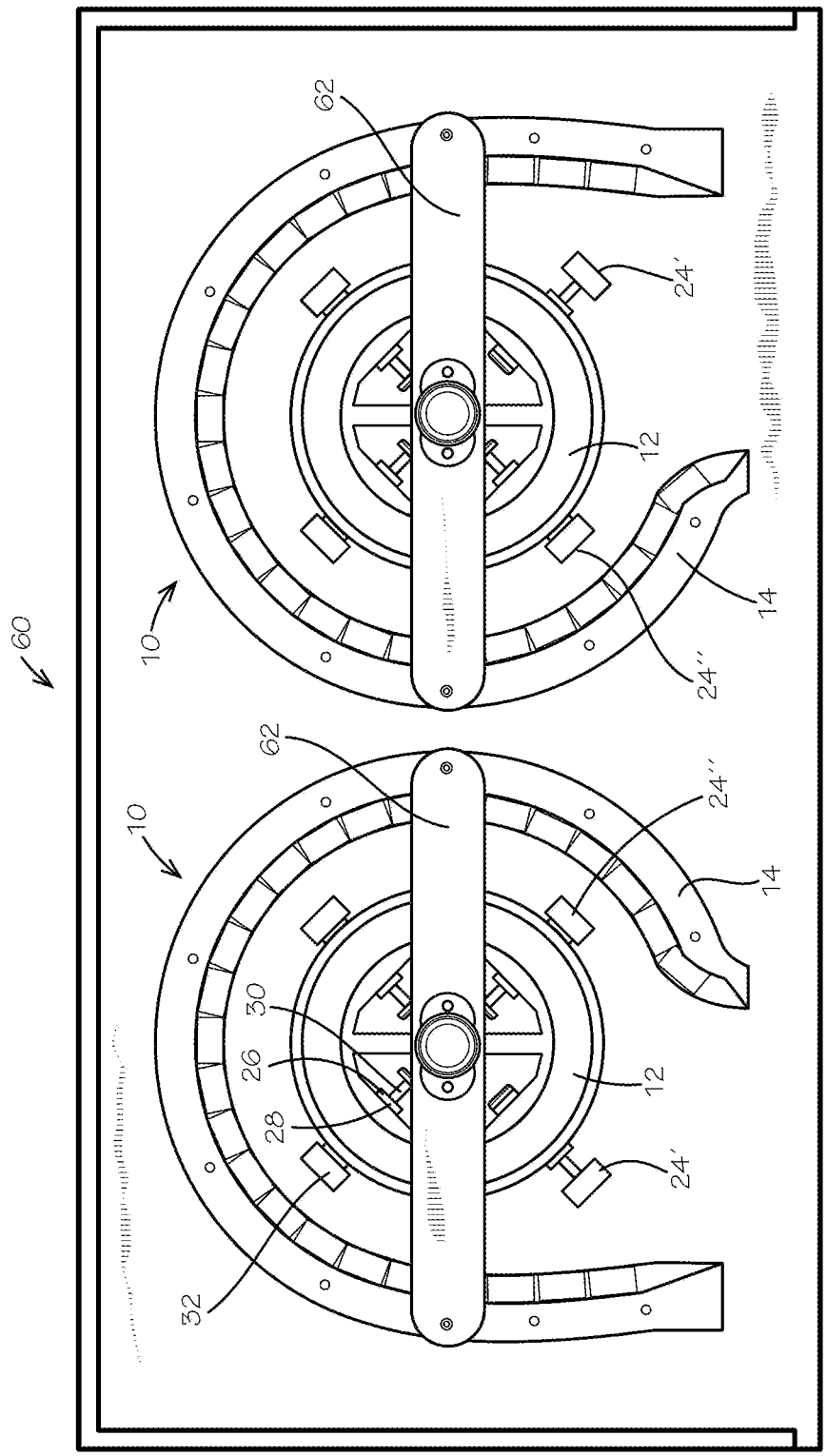
FIG. 6 illustrates a top view of the apparatus for conversion of energy shown in FIG. 5.
Figure 7:
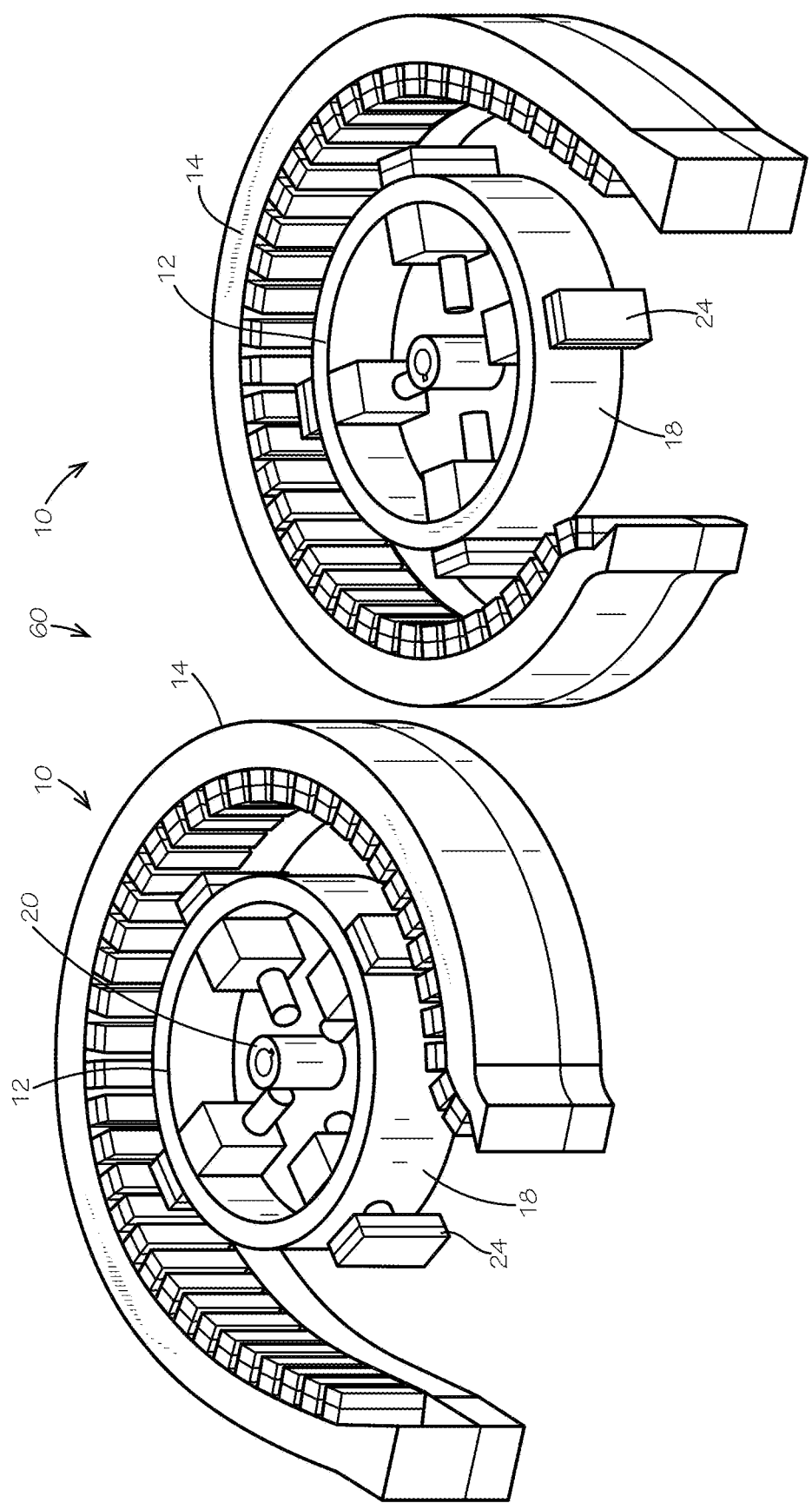
FIG. 7 illustrates a top view of portions of the apparatus for conversion of energy shown in FIG. 5.

With reference next to FIGS. 5-7, there is shown an energy converter assembly 60 in another preferred form of the invention. Here, the energy converter assembly 60 includes a set of two previously described energy converters 10 oriented to rotate in opposite directions to mitigate the torque effect of the rotating energy converters 10. The energy converter 10 shown in the top, right portion of the drawings rotates in the clockwise direction as previously described. However, the energy converter 10 shown in the bottom, left portion of the drawings rotates in the counter-clockwise directions.

The energy converter assembly 60 is also shown having four rotor magnet assemblies 24, each rotor magnet assembly 24 being set approximately 90 degrees apart. Each energy converter 10 also has a mounting brace 62 extending across the top of the stator 14 to stabilize the shaft 20. The mounting Trace 62 may also be utilized in the previously described embodiment of an energy converter 10.

It should be understood that as an alternative, the space 50 may be eliminated and the series of stator magnets be continuous, albeit the last stator magnets 40 being most distal from the rotor 12. With such an embodiment, the energy converter has a greatly reduced magnetic field at the location of the starting end, but such is not totally eliminated. The greatly reduced magnetic field allows the rotor magnet assemblies to move to their extended position similarly to the resulting action of the previously described space 50.

It should be understood that the apparatus for conversion of energy may be configured similarly to an inside-out motor wherein the rotor is positioned outside a centrally positioned stator. As such, the terms rotor magnet and stator magnet may be used interchangeably.

It thus is seen that an apparatus for conversion of energy includes a rotor having a main portion, a central rotor shaft coupled to the main portion, and at least one radially moving rotor magnet assembly coupled to the main portion for reciprocal movement between an extended position and a retracted position. The rotor is rotatable in a direction of rotor rotation. The rotor magnet assembly includes a rotor magnet and a reciprocating arm coupled to the rotor magnet and to the main portion. The apparatus for conversion of energy also has a stator positioned about the rotor. The stator has a series of stator magnets extending from a starting end to a finishing end in the direction of rotor rotation. Each stator magnet of the series of stator magnets is positioned more proximal to the rotor than the preceding stator magnet of the series of stator magnets in a direction extending from the starting end to the finishing end. The stator magnets are of the same polarity as the rotor magnet. With this construction, the rotation of the rotor shaft causes rotation of the rotor in the direction of rotor rotation, and the rotation of the rotor causes the rotor magnet assembly to move from the extended position to the retracted position due to the increasing repulsive magnetic field between the rotor magnet and the stator magnets as the rotor magnet moves in the direction of rotor rotation from a position adjacent the stator magnet of the starting end to a position adjacent the stator magnet of the finishing end.

It thus is seen that an apparatus for conversion of energy is now provided that allows for converting centrifugal energy into lateral directional energy. Although the apparatus for conversion of energy has been illustrated and described in its preferred form, it should be understood that many modifications, additions and deletions may be made to that specific form without departure from the spirit and scope of the invention as set forth in the claims.

What is claimed is:

1. An apparatus for conversion of energy, comprising:
a rotor having a main portion, a central rotor shaft coupled to said main portion, and at least one radially moving rotor magnet assembly coupled to said main portion for reciprocal movement between an extended position and a retracted position, said rotor being rotatable in a direction of rotor rotation, said rotor magnet assembly including a rotor magnet and a reciprocating arm coupled to said rotor magnet and to said main portion, and a stator positioned about said rotor, said stator having a series of stator magnets extending from a starting end to a finishing end in the direction of rotor rotation, each said stator magnet of said series of stator magnets being positioned more proximal to said rotor than the preceding stator magnet of said series of stator magnets in a direction extending from said starting end to said finishing end, said stator magnets being the same polarity as said rotor magnet, a second rotor having a second main portion, a second central rotor shaft coupled to said second main portion, and at least one radially moving second rotor magnet assembly coupled to said second main portion for reciprocal movement between an extended position and a retracted position, said second rotor being rotatable in a second direction of rotor rotation, said second rotor magnet assembly including a second rotor magnet and a second reciprocating arm coupled to said second rotor magnet and to said second main portion, and a second stator positioned about said second rotor, said second stator having a second series of second stator magnets extending from a second starting end to a second finishing end in the second direction of rotor rotation, each said second stator magnet of said second series of second stator magnets being positioned more proximal to said second rotor than the preceding second stator magnet of said second series of second stator magnets in a direction extending from said second starting end to said second finishing end, said second stator magnets being the same polarity as said second rotor magnet, whereby rotation of the rotor shaft causes rotation of the rotor in the direction of rotor rotation, and whereby the rotation of said rotor causes the rotor magnet assembly to move from the extended position to the retracted position due to the increasing repulsive magnetic field between the rotor magnet and the stator magnets as the rotor magnet moves in the direction of rotor rotation from a position adjacent the stator magnet of the starting end to a position adjacent the stator magnet of the finishing end.

2. The apparatus for conversion of energy of claim 1 wherein a space is positioned between said starting end and said finishing end of said series of stator magnets, wherein said space does not include any stator magnets.

3. The apparatus for conversion of energy of claim 1 wherein said rotor has a plurality of rotor magnet assemblies.

4. The apparatus for conversion of energy of claim 1 wherein said second direction of rotor rotation is in an opposite rotational direction than said direction of rotor rotation.

5. An apparatus for conversion of energy, comprising:
a rotor having a main portion and a plurality of rotor magnet assemblies coupled to said main portion for reciprocal movement between an extended position and a retracted position, said rotor being rotatable in a direction of rotor rotation, each said rotor magnet assembly of said plurality of rotor magnet assemblies including a rotor magnet and a mounting arm coupled to said rotor magnet, and a stator positioned about said rotor, said stator having a plurality of stator magnets extending from a starting end to a finishing end in the direction of rotor rotation, each said stator magnet of said plurality of stator magnets being positioned closer to said rotor than the preceding stator magnet of said plurality of stator magnets in a direction from said starting end to said finishing end, a second rotor having a second main portion and a second plurality of second rotor magnet assemblies coupled to said second main portion for reciprocal movement between an extended position and a retracted position, said second rotor being rotatable in a second direction of rotor rotation, each said second rotor magnet assembly including a second rotor magnet and a second mounting arm coupled to said second rotor magnet, and a second stator positioned about said second rotor, said second stator having a second plurality of second stator magnets extending from a second starting end to a second finishing end in the second direction of rotor rotation, each said second stator magnet of said second plurality of second stator magnets being positioned more proximal to said second rotor than the preceding second stator magnet of said second plurality of second stator magnets in a direction extending from said second starting end to said second finishing end, said second stator magnets being the same polarity as said second rotor magnet, whereby rotation of the rotor in the direction of rotor rotation causes the rotor magnet assemblies to move from their extended position to their retracted position due to the increasing repulsive magnetic field between the rotor magnet and the stator magnets as the rotor magnet moves in the direction of rotor rotation from a position adjacent the stator magnet of the starting end to a position adjacent the stator magnet of the finishing end.

6. The apparatus for conversion of energy of claim 5 wherein a space is positioned between said starting end and said finishing end of said series of stator magnets, wherein said space does not include any stator magnets.

7. The apparatus for conversion of energy of claim 5 wherein said stator magnets are the same polarity as said rotor magnets.

8. The apparatus for conversion of energy of claim 5 wherein said second direction of rotor rotation is in an opposite rotational direction than said direction of rotor rotation.

9. An apparatus for conversion of energy, comprising:

a rotor having a plurality of rotor magnet assemblies movable between an extended position and a retracted position, said rotor being rotatable in a direction of rotor rotation, each said rotor magnet assembly including a rotor magnet and a movable arm coupled to said rotor magnet, and a stator positioned about said rotor, said stator having a series of stator magnets extending from a starting end to a finishing end in the direction of rotor rotation, each said stator magnet of said series of stator magnets being positioned more proximal to said rotor than the preceding stator magnet of said series of stator magnets in a direction extending from said starting end to said finishing end, said stator magnets being the same polarity as said rotor magnet, a second rotor having a second plurality of moving second rotor magnet assemblies movable between an extended position and a retracted position, said second rotor being rotatable in a second direction of rotor rotation, each said second rotor magnet assembly including a second rotor magnet and a second reciprocating arm coupled to said second rotor magnet, and a second stator positioned about said second rotor, said second stator having a second series of second stator magnets extending from a second starting end to a second finishing end in the second direction of rotor rotation, each said second stator magnet of said second series of second stator magnets being positioned more proximal to said second rotor than the preceding second stator magnet of said second series of second stator magnets in a direction from said second starting end to said second finishing end, said second stator magnets being the same polarity as said second rotor magnet, whereby rotation of the rotor in the direction of rotor rotation causes each rotor magnet assembly to move from the extended position to the retracted position due to the increasing repulsive magnetic field between the rotor magnet and the stator magnets as the rotor magnet moves in the direction of rotor rotation from a position adjacent the stator magnet located at the starting end to a position adjacent the stator magnet located at the finishing end.

10. The apparatus for conversion of energy of claim 9 wherein a space is positioned between said starting end and said finishing end of said series of stator magnets, wherein said space does not include any stator magnets.

11. The apparatus for conversion of energy of claim 9 wherein said rotor has a housing and said plurality of rotor magnet assemblies are coupled to said housing.

12. The apparatus for conversion of energy of claim 9 wherein said second direction of rotor rotation is in an opposite rotational direction than said direction of rotor rotation.

* * * * *